United States Patent [19]

Saalbach et al.

[11] Patent Number: 4,939,901
[45] Date of Patent: Jul. 10, 1990

[54] TANDEM MASTER CYLINDER WITH PISTON STOPS AND CENTRAL VALVES

[75] Inventors: Kurt Saalbach, Moerfelden-Walldorf; Kurt Bergelin, Niedernhausen, both of Fed. Rep. of Germany

[73] Assignee: Alfred Teves GmbH, Frankfurt am Main, Fed. Rep. of Germany

[21] Appl. No.: 260,648

[22] Filed: Oct. 21, 1988

[30] Foreign Application Priority Data

Oct. 24, 1987 [DE] Fed. Rep. of Germany ....... 3736057

[51] Int. Cl.⁵ .......................... B60T 11/20; F15B 7/08
[52] U.S. Cl. .......................................... 60/562; 60/589
[58] Field of Search ................. 60/562, 568, 570, 589; 92/130 R, 130 D, 131, 133

[56] References Cited

U.S. PATENT DOCUMENTS

| | | | |
|---|---|---|---|
| 3,731,487 | 5/1973 | Beyer et al. | 60/562 X |
| 3,877,228 | 4/1975 | Shellhouse | 60/562 X |
| 4,296,604 | 10/1981 | Kizaki et al. | 60/562 |
| 4,472,941 | 9/1984 | Schopper et al. | 60/562 |
| 4,505,519 | 3/1985 | Muterel | 60/562 X |
| 4,707,989 | 11/1987 | Nakamura et al. | 60/562 X |

FOREIGN PATENT DOCUMENTS

| | | | |
|---|---|---|---|
| 1064993 | 10/1979 | Canada | 60/562 |
| 95404 | 11/1983 | European Pat. Off. | 60/562 |
| 1928849 | 12/1970 | Fed. Rep. of Germany | 60/562 |
| 2383807 | 11/1978 | France | 60/562 |
| 2075631 | 11/1981 | United Kingdom | 60/562 |

*Primary Examiner*—Robert E. Garrett
*Assistant Examiner*—George Kapsalas
*Attorney, Agent, or Firm*—Robert P. Seitter

[57] ABSTRACT

A tandem master cylinder for hydraulic brake systems of automotive vehicles comprising a housing in whose bore a first and a second piston are sealingly and slidably disposed. The piston in the inactive position abut on stops in the housing under the action of a first and a second resetting spring and which, within the bore, confine a first and a second pressure chamber which are in communication with a first and a second unpressurized supply chamber via central valves that are open when in the inactive position. The first piston-resetting spring is anchored on the second piston, and its spring rate is greater than the spring rate of the second piston-resetting spring.

2 Claims, 1 Drawing Sheet

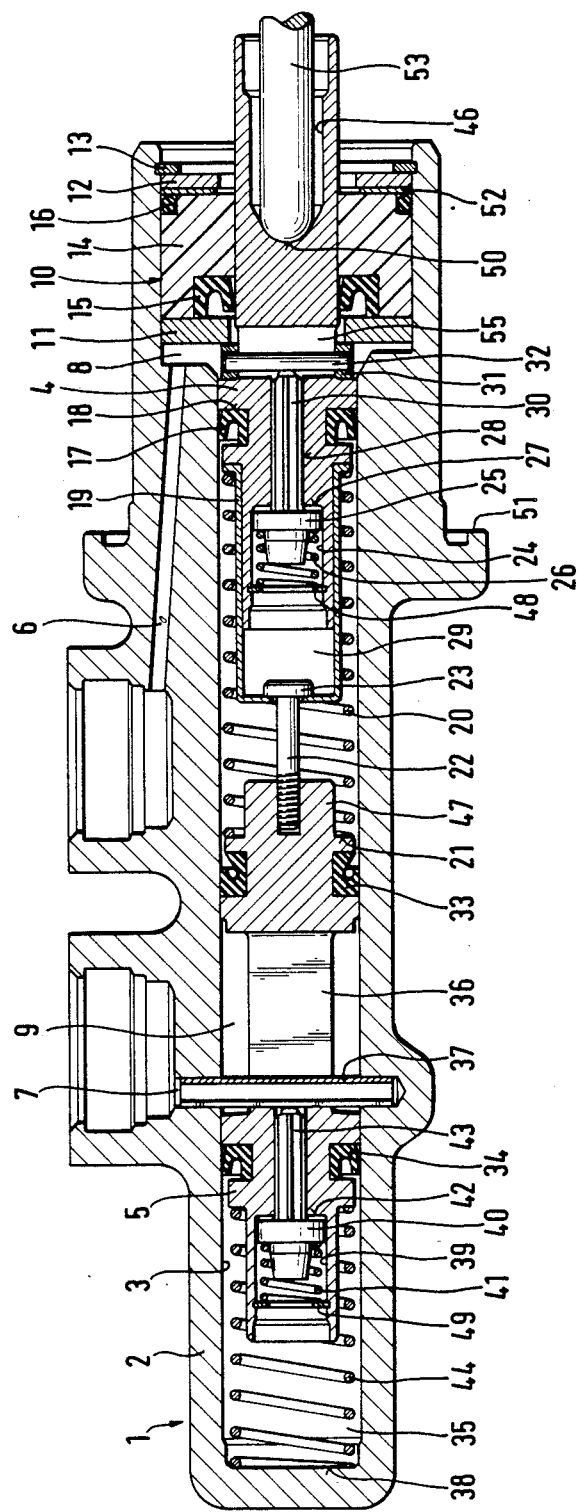

TANDEM MASTER CYLINDER WITH PISTON STOPS AND CENTRAL VALVES

BACKGROUND OF THE INVENTION

1. Field of the Invention

The present invention relates to a tandem master cylinder for hydraulic brake systems of automotive vehicles.

2. Description of the Relevant Art

A like master cylinder is known from German published patent application 34 24 513. In order to govern the lost travel of the tandem master cylinder described therein which, due to tolerances, are of differing size, the pistons abut on stops on the housing when in the release position of the tandem master cylinder, with the first piston being adjustable by means of a compensating element which is movable into abutment against the second piston; the compensating element being arranged between the stop on the housing and a stop on the first piston.

What has to be regarded as disadvantageous in the known tandem master cylinder are assembly problems in the area of the central valve of the first hydraulic pressure circuit. Such problems are due to the fact that the closure member (valve head) of the first central valve, and the associated valve spring, are not contained in an assembled condition within the first piston, as is the case with the central valve of the second piston.

Therefore, it is an object of the present invention to devise a tandem master cylinder of the type initially referred to which permits a considerable increase in the reliability of the assembly, with little assembling effort and using simple assembling means.

SUMMARY OF THE INVENTION

In accordance with the present invention, a tandem master cylinder for hydraulic brake systems of automotive vehicles comprises a housing having a bore with a first and a second piston sealingly and slidably disposed therein, which pistons in the inactive position abut on stops on the housing under the action of a first and second resetting spring and which confine a first and a second pressure chamber within the bore. The pressure chambers are in communication with a first and a second unpressurized supply chamber via central valves that are open when in the inactive position.

The first piston-resetting spring is mounted and retained upon the second piston and its spring rate is greater than the spring rate of the second piston-resetting spring. The inventive measures allow complete standardization of the central valve areas of the two pistons.

A favorable improvement of the subject matter of this invention provides that the first piston-resetting spring is retained on the second piston by means of a guide sleeve which is axially slidably supported on the first piston and is coupled to the second piston therefore, by central clamping bolt which projects in an axially movable manner through the guide sleeve from an enlarged head retained in the guide sleeve and is threadingly engaged with the second piston to permit the sleeve to move toward the second piston by compressing the spring while limiting movement of the sleeve away from a second piston under the biasing action of the spring. These measures permit a particularly low-cost and reliable operating design of the subject matter of this invention.

The operational reliability of the tandem master cylinder of the present invention is augmented in that the end of the first piston-resetting spring, remote from the first piston, is supported on a radial annular surface of the second piston, axially adjacent to which surface is a guide portion whose diameter corresponds to the internal diameter of the first piston-resetting spring.

A preferred embodiment of this invention is illustrated in the drawing and will be described in more detail in the following specification.

DESCRIPTION OF THE DRAWING

The FIGURE is a sectional view of a tandem master cylinder embodying the present invention.

DESCRIPTION OF THE PREFERRED EMBODIMENTS

The tandem master cylinder 1, shown in FIG. 1, comprises a housing 2 having a bore 3 with a first piston 4 and a second piston 5 sealingly and slidably disposed therein. Supply channels 6, 7 extend from a supply reservoir (not illustrated) and terminate respectively in the supply chambers 8 and 9, disposed behind primary and secondary sleeves 17 and 34, respectively. The supply chamber 8 is sealed, in relation to the atmosphere, by virtue of a sealing assembly 10. Sealing assembly 10 is bounded by a disc 11 on the inner side and by the discs 52 and 12 on the outer side. When viewed in the drawing, piston 4 is preloaded to the right. Via the disc 11, the sealing assembly 10, and the discs 52 and 12, piston 4 is supported by a stop on housing 2, the stop comprising a guard ring 13 secured in the bore 3.

Further, sealing assembly 10 comprises a guide ring 14 having a sealing sleeve 15, disposed on the radially inner edge of its inner end confining the supply chamber 8, and an O-ring 16 disposed on its radially outer edge of its outer end. The sealing sleeve 15 and the O-ring 16 seal the supply chamber 8 from the atmosphere.

As a piston seal, the first piston 4 carries primary sleeve 17 which is axially and radially secured in an annular groove 18 of the first piston 4. Bearing against the front end of the first piston 4 (the left end in the FIGURE), via a guide sleeve 19, is a first piston-resetting spring 20 which is designed as a compression spring. Spring 20 is seated at its opposite end against a radial annular surface 21 of the second piston 5. The first piston-resetting spring 20 is retained upon the second piston 5 by the guide sleeve 19 and a rod-shaped central clamping bolt 22. The clamping bolt 22 projects axially freely through an aperture in the end of the guide sleeve 21, to abut on the inner side of sleeve 21 with a head 23. The other end of bolt 22 is threadably received in a guide portion 47 of the second piston 5, thus the guide sleeve 19, spring 20, and bolt 22 are terminally mounted on the second piston 5.

A cylindrical recess 24 is formed in the inner end face of first piston 4, facing second piston 5, and accommodates a valve head member 25 therein. Also disposed in the recess 24 is valve spring 26 which urges the valve member 25 to the right, as viewed in the drawing, in the direction of a sealing seat 27 on piston 4. The other end of spring 26 is seated on a guard ring 48 fixed in the recess 24. A central supply bore 28 extends longitudinally through the first piston 4 from the sealing seat 27 towards the right, as viewed in the drawing, thereby interconnecting supply chamber 8 with a first pressure chamber 29 formed between the first and the second pistons 4, 5. The first pressure chamber 29 communicates, via a non-illustrated pressure line, with a hydraulic actuating device such as a wheel cylinder of a brake or a hydraulically actuable clutch slave cylinder of an automotive vehicle.

The valve member 25 comprises a valve tappet 30 which passes longitudinally through supply bore 28 and which abuts on a stop pin 32 extending radially through ring 31 and piston 4 via a slot 55. Bearing against ring 31 is first piston 4 which, in turn, via the disc 11, the sealing assembly 10, and the discs 52 and 12, is supported by the guard ring 13 on the housing. In the illustrated initial position of the tandem master cylinder 1, the valve member 25 is displaced from sealing seat 27 so that the first valve is opened.

The second piston 5 is provided with a first sealing sleeve 33 which seals relative to first pressure chamber 29, and with a secondary sealing sleeve 34 which seals in a pressure-tight manner to isolate a second pressure chamber 35 from the supply chamber 9. Between the first sealing sleeve 33 and the secondary sleeve 34, a slot 36 is formed in the second piston 5 in which a clamping pin 37 extends radially across bore 3 and is secured in the housing 2. The length of slot 36 is sized such that the second piston 5, in the event of maximum displacement, is allowed to abut with the bottom 38 of the bore 3.

The second piston 5 incorporates an expanding stepped bore 39 extending longitudinally through piston 5, and which is open towards the second pressure chamber 35 to accommodate a second valve member 40. Valve member 40 has a valve spring 41 abutting thereon and against a second guard ring 49 in the stepped bore 39. Disposed at the transition from the larger to the smaller portion of the stepped bore 39 is a second sealing seat 42. The stepped bore 39 extends in the second piston 5 from the second sealing seat 42 to the right, when viewed in the drawing, to the second supply chamber 9.

A second valve tappet 43 extends longitudinally through the smaller-diameter portion of the stepped bore 39 and abuts, with its right-hand end, when viewed in the drawing, on clamping pin 37. The clamping pin 37 is of sleeve-shaped design and, on one hand, serves as a stop in the housing for the second valve member 40 and, on the other hand, as a supply channel 7. Instead of the clamping pin 37, a cylinder pin may be used as well. If so, however, a separate supply channel must be provided in housing 2. A second piston-resetting spring 44, having a lower spring rate than the first piston-resetting spring 20, is supportingly disposed between the second piston 5 and the bottom 38 of bore 3.

In the illustrated release position of the tandem master cylinder 1, the second piston-resetting spring 44 urges the second piston 5 against the clamping pin 37 so that the slot end surface 45 of second piston 5 abuts against the clamping pin 37. Unlike the first piston-resetting spring 20, the second piston-resetting spring 44 is not anchored, but is seated between the second piston 5 and the bottom 38 of bore 3.

At its outer end, on the right-hand side as viewed in the drawing, the first piston 4 contains a blind-end bore 46, open to the right, with a half-shell shaped recess 50 which is directed towards the open end of the blind-end bore 46. The recess 50 and the blind-end bore 46 serve to accommodate a push rod 53. The push rod 53 may, for example, be a push rod of a brake power booster not shown in the drawing.

The housing 2 also includes a surface 51 which serves as an abutting surface for attachment of the tandem master cylinder 1 to a flange surface, such as the splashboard of a vehicle or the housing of a brake power booster.

The inventively designed tandem master cylinder operates as follows. In the inactive position illustrated in the FIGURE, both pistons 4 and 5 assume their inactive position. The pressure chambers 29 and 35 are in communication with the above-mentioned supply reservoir, not displayed in the drawing, via the open central valves 25, 27 and/or 40, 42, the supply chambers 8 and 9 and the supply channels 6 and 7. When the tandem master cylinder is actuated, by virtue of the push rod 53, simultaneous movement of the two pistons 4 and 5 to the left and, consequently, simultaneous closing of the two central valves 25 and 40 will take place.

What is claimed is:

1. In a tandem master cylinder for an automotive hydraulic brake system including a housing having a bore sealed at its opposite ends, a first and a second piston sealingly and slidably received in said bore to define a first pressure chamber between said first and second pistons and a second pressure chamber between said second piston and one end of said bore, first and second stop means in said housing respectively engageable with said first and second pistons to define respective rest positions, first and second valve means associated respectively with said first and second pistons for hydraulically connecting said first and second pressure chambers to an unpressurized supply chamber when said first and second pistons are engaged with their respective first and second stops and movable to respective closed positions sealing said first and second chambers upon movement of said first and second pistons out of engagement with said first and second stops, first spring means biasing said first piston toward said first stop, and second spring means engaged bwetween said one end of said bore and said second piston biasing said second piston toward said second stop;

the improvement wherein said first spring means comprises a shoulder on said second piston defining a spring seat facing said first piston, a hollow guide sleeve having an end wall at one end and a radially outwardly projecting flange at its other end, a clamping bolt having a head seated in said guide sleeve at said one end and a shank projecting loosely from said sleeve through said end wall and threadably received in the end of said second piston facing said first piston, and a compression spring engaged between said shoulder and said flange, ssaid first piston having a at the end thereof facing said second piston slidably received with said other end of said guide sleeve, and said first valve means comprises a valve head slidably received within a passage extending inwardly of said projection from the end of said projection facing said second piston, and a valve spring seated in said passage and biasing said valve head inwardly of said passage.

2. The invention defined in claim 1 wherein the spring rate of said first spring means is greater than the spring rate of said second spring means.

* * * * *